United States Patent
DeBoynton et al.

(12)

(10) Patent No.: US 6,366,714 B1
(45) Date of Patent: Apr. 2, 2002

(54) HIGH RELIABILITY FIBER COUPLED OPTICAL SWITCH

(75) Inventors: William Leon DeBoynton, Santa Ana; Eliseo Romolo Ranalli, Irvine, both of CA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/286,912

(22) Filed: Apr. 6, 1999

Related U.S. Application Data

(60) Provisional application No. 60/090,021, filed on Jun. 19, 1998.

(51) Int. Cl.[7] .................................................. G02B 6/26
(52) U.S. Cl. ............................. 385/16; 385/17; 385/22
(58) Field of Search ............................. 385/16, 17, 18, 385/19, 22

(56) References Cited

U.S. PATENT DOCUMENTS

| | | | |
|---|---|---|---|
| 4,407,562 A | | 10/1983 | Young ........................ 350/96.2 |
| 4,759,597 A | | 7/1988 | Lemonde .................... 350/96.2 |
| 4,763,977 A | * | 8/1988 | Kawasaki et al. ......... 350/96.15 |
| 4,790,621 A | | 12/1988 | Calaby et al. .............. 350/96.2 |
| 4,896,937 A | | 1/1990 | Kraetsch et al. ............ 340/96.2 |
| 4,911,520 A | | 3/1990 | Lee ............................. 350/96.2 |
| RE33,296 E | | 8/1990 | Stowe et al. ................. 350/320 |
| 4,946,236 A | * | 8/1990 | Dautartas et al. ........... 350/96.2 |
| 5,146,519 A | * | 9/1992 | Miller et al. .................... 385/43 |
| 5,175,776 A | | 12/1992 | Lee .............................. 385/16 |
| 5,268,975 A | * | 12/1993 | Yoshitani et al. .............. 385/22 |
| 5,483,608 A | * | 1/1996 | Yokomachi et al. .......... 385/22 |
| 5,835,199 A | * | 11/1998 | Phillips et al. ............. 356/5.03 |
| 6,169,830 B1 | * | 1/2001 | Kewitsch et al. .............. 385/37 |
| 6,169,838 B1 | * | 1/2001 | He et al. ..................... 385/129 |

* cited by examiner

*Primary Examiner*—Frank G. Font
*Assistant Examiner*—Roy M Punnoose
(74) *Attorney, Agent, or Firm*—Eric M. Smith; Daniel P. Malley

(57) ABSTRACT

A fused coupler optical switch (FCOS) of the present invention is an electrically switchable device that functions as a latching bi-directional optical cross bar switch with a first and a fourth optical ports at a first end, and, a second and third ports at a second end of the coupler, where a magnetic sleeve surrounds the second end of the coupler. A first stop block maintains the coupler in a first mechanical position and a second stop block maintains the coupler in a second mechanical position, where the first and second stop blocks are V-grooved stop blocks. In the first position, the first port is optically connected with the third port and the fourth port is connected with the second port. In the second position, the first port is optically connected with the second port and the fourth port is connected with the third port. The inventive optical switch may include a sensor element such as a Hall element for detecting the state of the optical switch.

7 Claims, 5 Drawing Sheets

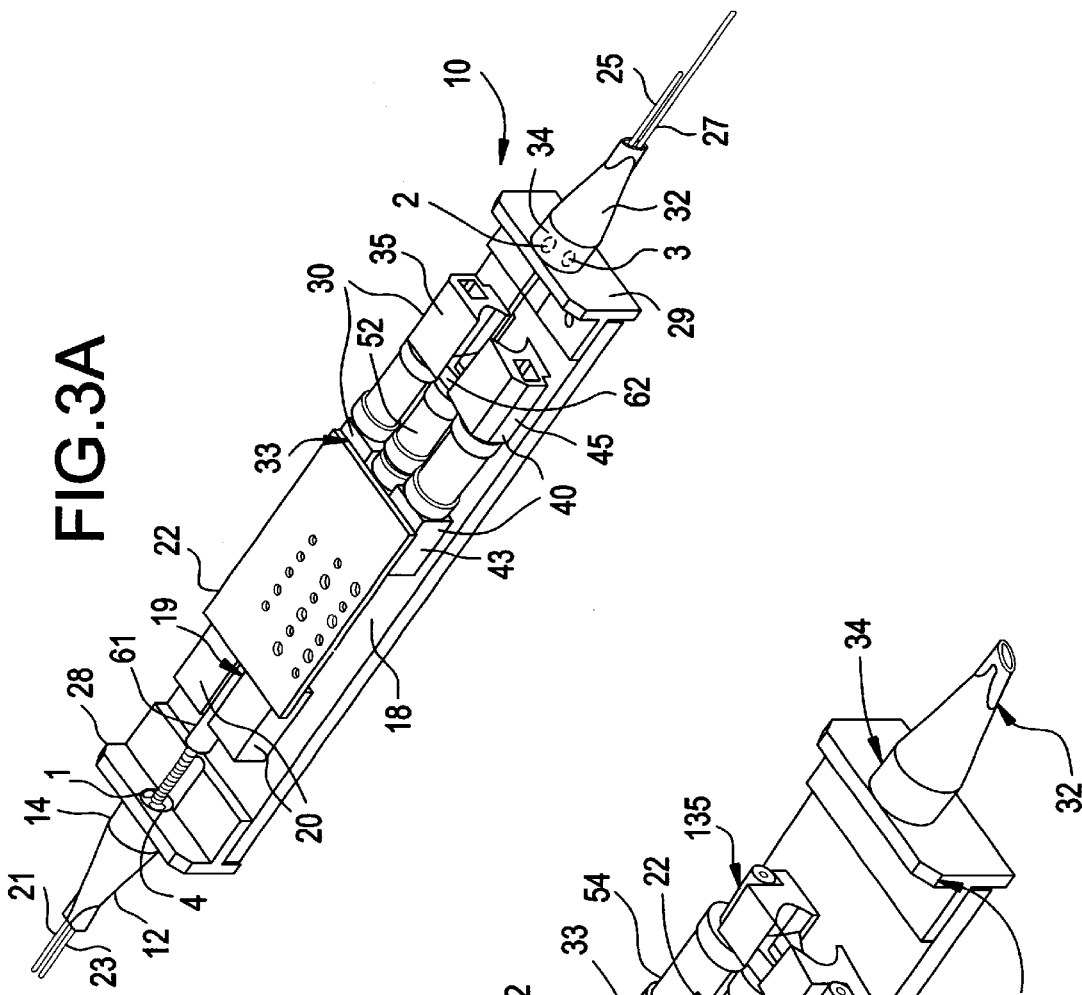
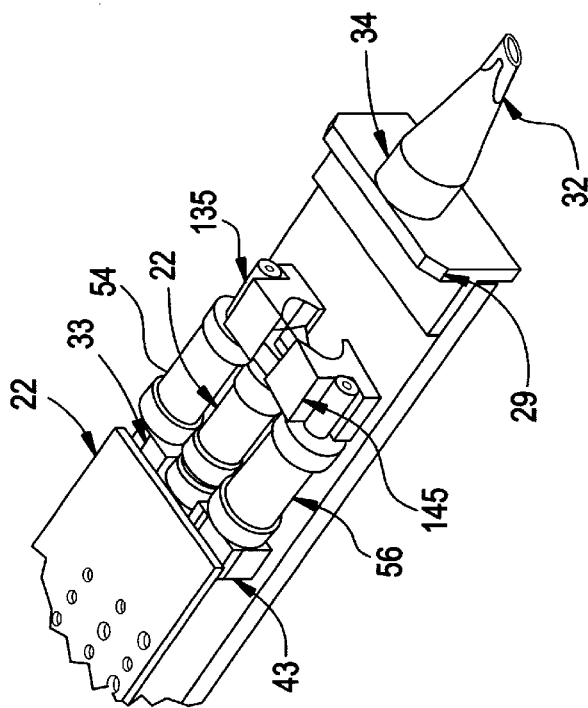

HIGH RELIABILITY FIBER COUPLED OPTICAL SWITCH

This application is based upon the provisional application Ser. No. 60/090,021, filed Jun. 19, 1998, which we claim as the priority date of this application.

FIELD OF THE INVENTION

The present invention relates to a high reliability fiber coupled switch. In particular, the present invention relates to a fused coupler optical switch (FCOS) that functions as a bidirectional optical cross-bar switch. The switch uses a magnetic field to bend the coupled region to switch between cross and bar states. The strain resulting from such bending causes the coupled fibers to lie along different bend radii resulting in a variable power coupling ratio.

BACKGROUND OF THE INVENTION

Fiber optic communication systems now use optical fiber cables to transmit information within communications networks such as wide area networks and local area networks. Switches permit optical paths within the network to be changed to allow for the information to be directed to a particular unit or units or even to bypass a particular unit. Switches for such uses must exhibit a high degree of reliability over many switch cycles, low insertion loss, low crosstalk, and short switch times.

Several forms of optical fiber switches are known. In some switch arrangements the switching function is accomplished by placing an optical device within the optical path. One type of prior art optical switch utilizes a movable blocking element to switch light from one fiber to another or to an off position. U.S. Pat. No. 4,790,621 (Calaby et al.) discloses the use of a movable prism to switch light from one fiber to another. U.S. Pat. No. 4,261,638 (Wagner) discloses the use of a reflecting member to switch light along different optical paths.

Mechanical switching arrangements are also known. In such devices an optical fiber is fixedly mounted to a movable member and the member is physically displaced from a first to a second position to switch the optical path. U.S. Pat. No. 4,911,520 (Lee) utilizes a cantilevered glass tongue to which a fiber is edgewise mounted. A first and a second fiber are similarly mounted along the edges of a fixed block. Moving the glass member from a first to a second position removes the fiber thereon from a first optical path that includes the first fixed fiber and places the fiber into a second optical path that includes the other fixed fiber.

In U.S. Pat. No. 4,407,562 (Young) optical fibers are secured in grooves disposed on the exterior surface of a movable housing. Displacement of the housing brings the faces of the fibers into and out of alignment with other arrays of fibers, thereby to cause the switching action. Alignment of the movable housing with the casing in which it is disposed is effected using alignment grooves. U.S. Pat. No. 4,896,937 (Kraetsch et al.) provides two V-grooves, one in the cover and another in the base of the housing. The switching action is accomplished by moving a ferromagnetic strip to which a fiber is attached into position in one of the V-grooves.

U.S. Pat. No. 4,759,597 (Lemonde) mounts an optical fiber to a magnetic rocker arm. The pivotal motion of the rocker arm moves the fiber between corresponding fibers secured in grooves respectively provided in an upper and a lower support slab.

U.S. Pat. No. 4,946,236 (Dautartus et al.) discloses a switch in which the displacing force is applied to the fiber itself. The switch includes fibers that are surrounded by a magnetic sleeve. The fibers are disposed within grooves defined by the corners of an elongated, diamond shaped, internal channel extending through a block. A magnetic field is applied to effect the displacement of the fibers from one corner of the groove to another.

U.S. Pat. No. 5,175,776 discloses an optical fiber switch comprising a base having a block portion thereon. The block has a surface in which at least a first and a second groove are formed. An optical fiber has a first predetermined portion of its length adjacent to its end face received in one of the grooves. The axis of the fiber in this first predetermined portion of the fiber spaced behind the first portion is mounted over an inclined ramp, thereby bending the portion of the fiber forwardly thereof. The biasing force is generated by the bending of the fiber. Preferably, the surface of the ramp defines an angle with respect to the base that lies in a range from five (5) to fifteen (15) degrees. The ramp may be grooved, if desired. A switching member is reciprocally movable with respect to the base from a first to a second position. The motion of the switching member is generally transverse to the direction of the biasing force. During its movement, the switching member engages operatively against the fiber thereby to move the first predetermined portion thereof against the biasing force out of the one groove and into the other groove. As the fiber is displaced, the biasing force acts thereupon to urge the first predetermined portion of the fiber toward the bottom of that other groove. In the preferred instance the switching member takes the form of a yoke connected via a rocker arrangement to an actuating solenoid. The yoke engages operatively against an intermediate portion of the fiber disposed between the ramp and grooved block.

The above described prior art optical switches suffer from a number of shortcomings with respect to packaging, including fiber bend radius and environmental sensitivity, performance and reliability, and manufacturability.

In another prior art reference, U.S. Pat. No. 5,146,519 to Miller et al. (and assigned to the assignee in this application), discloses a fiber coupler optical switch that operates by rotating the coupler at one end between bent and coupled states, such that the coupling characteristics are tunable based on the degree of rotation.

In view of the foregoing, it is an object of the present invention to provide an optical switch which has a relatively large (low stress) fiber bend radius, is relatively insensitive to changes in environmental conditions such as temperature, has a highly reliable performance, is easily and repeatably manufacturable, and can adjust the coupling characteristics based on linear displacement.

SUMMARY OF THE INVENTION

In accordance with an illustrative embodiment of the invention, an optical switch includes fused coupler, preferably formed of glass, has first and second ends and a coupling region therebetween. There are first and fourth optical ports at the first end of the coupler and second and third optical ports at the second end of the coupler. A clamping element fixedly clamps the first end of the coupler in an elastomeric support for the reduction of concentrated stress in the coupler element. The second end of the coupler is free. A magnetic sleeve surrounds the coupler near the free end. A first stop block is located on one side of the sleeve. A second stop block is located on the opposite side of the sleeve from the first stop block. There is a circuit for generating a first magnetic field which causes the sleeve to move into contact with the first stop block and for generating a second magnetic field which causes the sleeve to move into contact with the second stop block. In the first position (contact of the coupler with the first stop block), the first port is optically connected with the second port and the fourth port is optically connected with the third port. In the second position (contact of the coupler with the second stop block), the first port is optically connected with the third port and the fourth port is optically connected with the second port.

In a preferred embodiment of the invention, the first stop block comprises a first flat stop and a first V-groove stop. Similarly, the second stop block may comprise a second flat stop and a second V-groove stop. The inventive optical switch may include a sensor element such as a Hall element for detecting the first magnetic field or the second magnetic field, thereby detecting the state of the optical switch.

In another preferred embodiment, there is an athermalized joint between the sleeve and the coupler. The athermalized joint is formed from an elastomeric material for matching coefficients of thermal expansion of the coupler and the sleeve. Note that the locations of the attachments between the stop blocks and the substrate base are chosen for purpose of athermalization and are subject to the materials used.

BRIEF DESCRIPTION OF THE DRAWINGS

The following detailed description, given by way of example and not intended to limit the present invention solely thereto, will best be understood in conjunction with the accompanying drawings, where similar elements will be represented by the same reference symbol, in which:

FIG. 3A is a perspective view of the optical switch according to an illustrative embodiment of the invention;

FIG. 4 is a perspective view of an optical switch having V-groove stops according to another illustrative embodiment of the invention.

DETAILED DESCRIPTION OF THE INVENTION

Figure 1A:
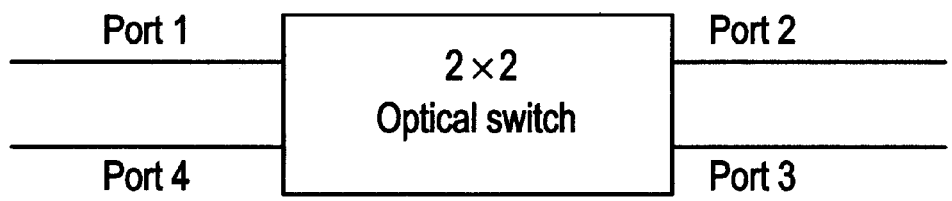
FIGS. 1A, 1B, and 1C schematically illustrate the operation of a fused coupler optical switch according to the invention.
Figure 1B:
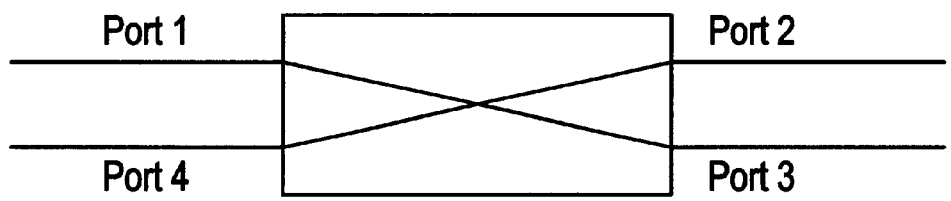
Figure 1C:
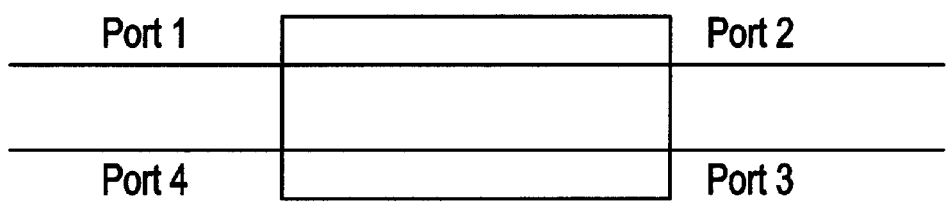

The fused coupler optical switch (FCOS) of the present invention is an electrically switchable device that functions as a latching bi-directional optical cross-bar switch with single-mode fiber pigtails. In this context, latching refers to the fact that the FCOS will maintain the desired state without further electrical input. The FCOS uses fused coupler technology and a magnetic field to mechanically bend the coupling region, via a magnetic sleeve or armature, to switch between cross and bar states. FIG. 1A is a schematic diagram of the FCOS of the invention. The device has four ports, port 1 and port 4 being at a first end of the device and port 2 and port 3 being at a second end of the device. In the cross state shown in FIG. 1B, port 1 is optically connected to port 3 and port 4 is optically connected to port 2. In the bar state shown in FIG. 1C, port 1 is connected to port 2 and port 4 is connected to port 3.

As indicated above, the optical switch of the present invention, is based on a fused coupler. The fused coupler is well known in the prior art. See, for example, U.S. Pat. No. Re 33,296. Illustratively, a fused coupler includes a first single-mode optical fiber having a first longitudinal segment having an inner core having a relatively high index and a cladding having a relatively low index of refraction. The device also includes a second single-mode optical fiber having a second longitudinal segment having an inner core having a relatively high index of refraction and a cladding having a relatively low index of refraction. A coupling region is included in the subject device having the first and second longitudinal portions fused together in parallel juxtaposition to one another. The coupler further includes a housing means for maintaining the first and second longitudinal portions substantially straight and for maintaining the first and second longitudinal portions in a stable environment. Other coupler designs are also well known.

Illustratively, a pair of fiber pigtails at one end of the housing form port 1 and port 4. Another pair of fiber pigtails at the other end of the housing form port 2 and port 3.

The FCOS 10 of the present invention makes uses of the fact that a fused coupler exhibits variable optical power splitting ratios as a function of strain induced in the coupling region by mechanical bending. One end of the coupling region is held in an armature and bent mechanically with the help of a magnetic field. The strain resulting from such bending causes the coupled waveguides to lie along different bend radii resulting in the variable power coupling ratio. This enables the FCOS to act as a switch.

Figure 2A:
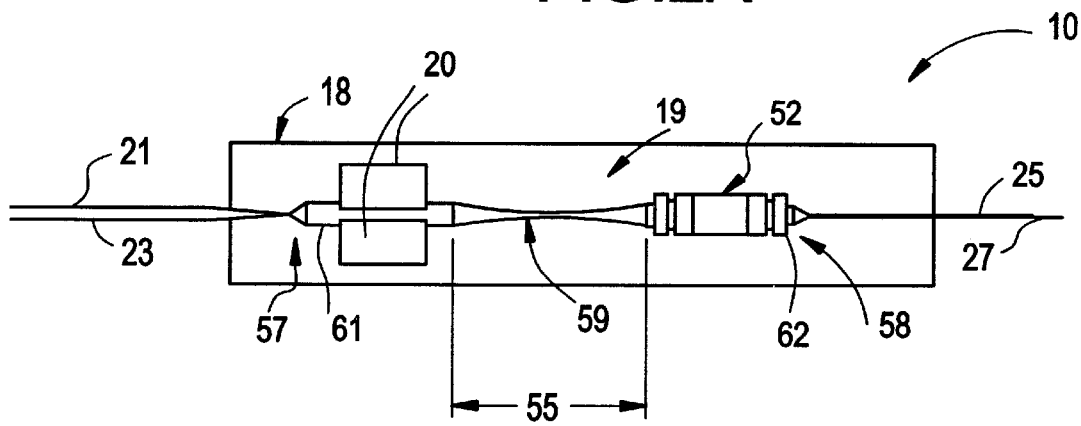
FIG. 2A is a top view of a portion of an optical switch according to an illustrative embodiment of the invention.
Figure 2B:
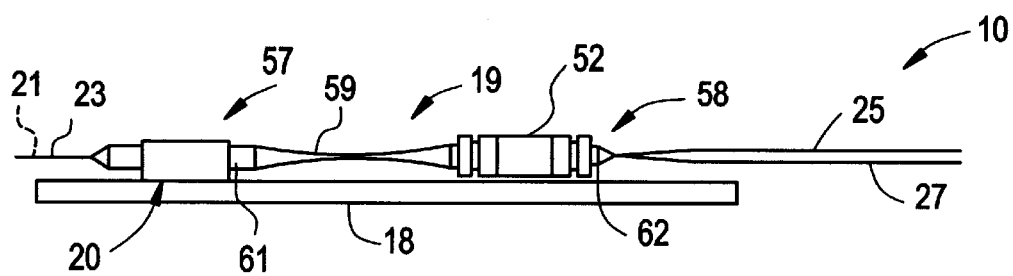
FIG. 2B is a side view of a portion of the optical switch of FIG. 2A according to an illustrative embodiment of the invention.

FIGS. 2A and 2B, illustrate a portion of the inventive fused coupler optical switch 10. As shown, FCOS 10 includes a fused optical coupler 19. The fused optical coupler has a housing or cane 59, preferably formed of boroxilicate glass, which contains coupled optical fibers. The housing comprises a first cylindrical region 61 at its first end 57, a second cylindrical region 62 at its second end 58, and a coupling region 55 therebetween. Preferably, fused optical coupler 19 has a length of 50 mm, where first cylindrical region 61 is 13 mm in length, second cylindrical region 62 is 13 mm in length and coupling region 55 is 24 mm in length. In addition, the diameters of the first and second cylindrical regions 61, 62 are 2.5 mm, respectively.

A first pair of fiber pigtails 21 and 23, representing first and fourth optical ports, respectively, are positioned at the first end 57 of fused optical coupler 19, while a second pair of fiber pigtails 25 and 27, representing second and third optical ports, respectively, are positioned at the second end 58 of the fused optical coupler. The pigtails may be formed of, e.g., Corning® SMF-28 with a CPC3 coating. Further, each fiber pigtail is illustratively 2 meters in length.

As shown, the first end 57 of the optical coupler is fixedly mounted to a baseplate 18 via clamping element 20. The baseplate is illustratively approximately 3.380" in length, 0.895" in width and formed from a material such as SiO2, INVAR 36 or other low CTE material. The clamping element has the dimensions of 0.50"×0.50"×0.19" (L, W, T) and may be formed from steel, glass, etc. In addition, a magnetic sleeve or armature 52 surrounds the second end 58 of the fused optical coupler. The magnetic sleeve has a length and a diameter of 0.255" and 0.188", respectively. There is a contact sleeve 50, which is bonded to the cane 58 and to the magnetic sleeve 52 on both ends of the magnetic sleeve 52. This contact sleeve is magnetically permeable (formed of a ferrous material) and includes a 0.188"spherical surface for contacting flat and V-grooved stop blocks.

Figure 3B:
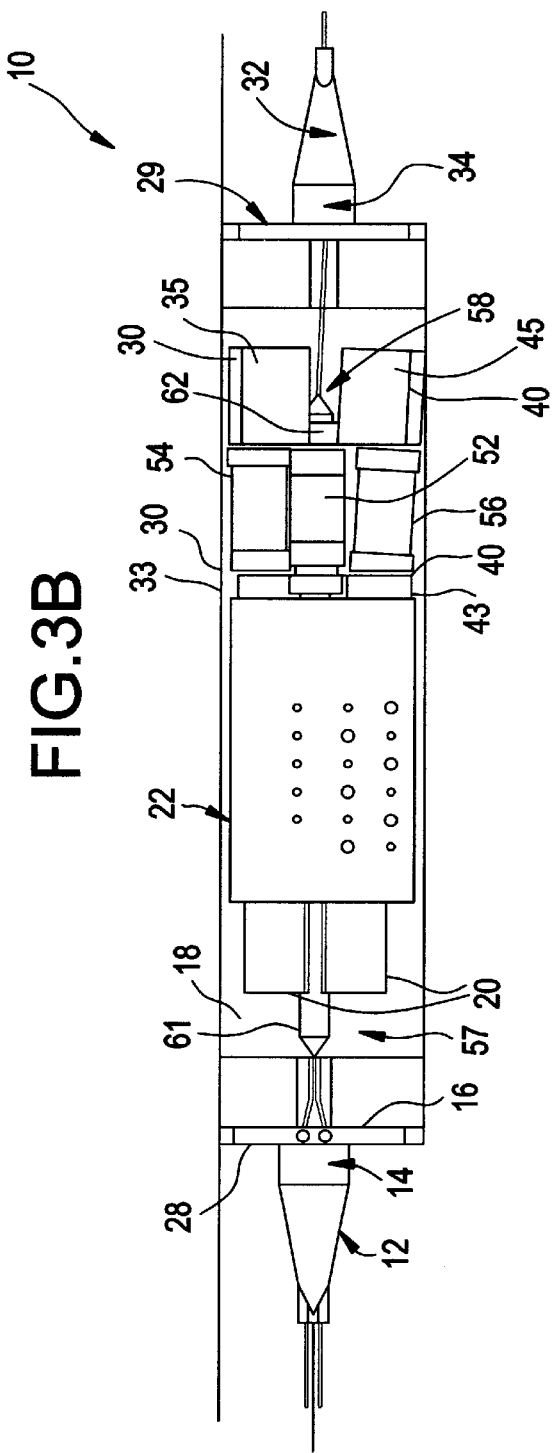
FIG. 3B is a top view of the optical switch of FIG. 3A according to an illustrative embodiment of the invention.
Figure 3C:
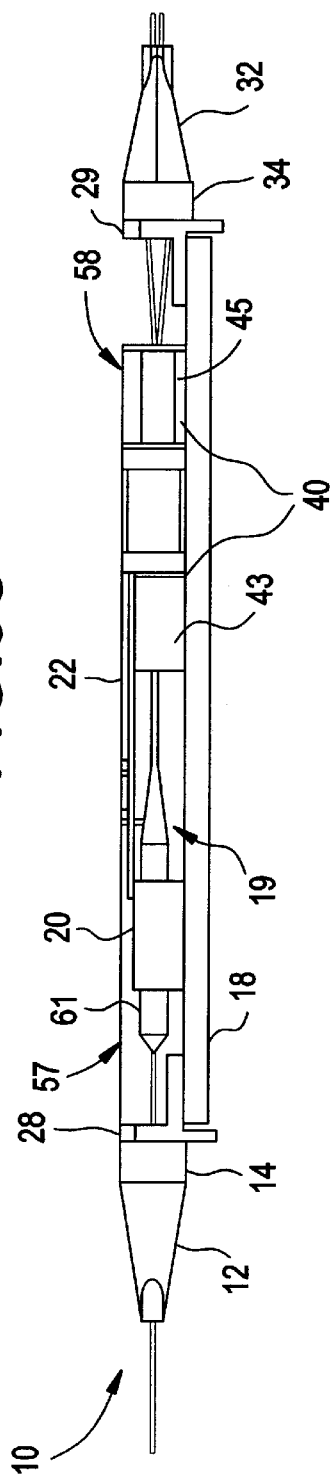
FIG. 3C is a side view of the optical switch of FIG. 3A according to an illustrative embodiment of the invention.

Referring to FIGS. 3A, 3B and 3C, a more complete embodiment of the inventive fused coupler optical switch 10 is shown (which includes the elements of FIGS. 2A and 2B) in perspective, top and side views, respectively. In particular, first and second endplates 28, 29 are connected to first and second ends of baseplate 18, respectively. The dimensions of endplates 28 and 29 are 0.72"×0.31"×0.355" (L, W, T) and may be formed from a material such as aluminum. Attached to each endplate 28 and 29 is a strain relief hub 14 and 34, respectively, which can be made integral with the endplates. The function of the strain relief hubs 14 and 34 is to be the point of fixity for the fibers 21, 23, 25, 27 entering the switch enclosure. The strain relief hubs 14 and 34 are bonded to the endplates and have small anchoring holes 1, 4 and 2, 3, respectively, each having a diameter of 0.03" for each fiber. The strain relief hubs 14 and 34 also have a projecting boss with the dimensions of 0.114"×0.110" for attachment of the strain relief boots 12 and 32, respectively. This arrangement allows sufficient bonding area to support the forces generated by external loads that may be applied to the fibers 21, 23, 25, and 27. The strain relief boots 12 and 32 are bonded to the strain relief hubs using, e.g., silicon rubber adhesive and support the attachment of numerous 900 μm loose tubes (not shown) which act as a protective conduit for each fiber. The loose tubes are similarly bonded to the strain relief boots with a silicon rubber adhesive. The position of the strain relief hub and its fiber anchoring holes is critical in the design of high reliability devices in order to limit the long term stress loading of the fibers. This is not a problem when the device can occupy a large volume but is a constraint on package size because the stressing of the fibers must be limited to <30,000 PSI for the long term (e.g., 25 years). In addition, note that the strain relief boots and hubs reduce the stress and act as bend limiters on the pigtails.

As discussed with reference to FIGS. 2A and 2B, magnetic sleeve 52 surrounds the second end of the fused optical coupler. In addition, first and second coil assemblies are disposed on either side of the magnetic sleeve 52. Coil assemblies 54 and 56 form a magnetic field generator, such as a variable-reluctance magnetic circuit. The length and diameter of each coil are 0.31"×0.20", respectively. In addition, each coil assembly contains approximately one thousand coil windings.

A first stop block 30 is located at the top side of magnetic sleeve 52. A second stop block 40 is located on the opposite bottom side of the magnetic sleeve. In a preferred embodiment of the invention, first stop block 30 includes a first flat stop 33 and a first V-groove stop 35, separated by coil assembly 54. Similarly, second stop block 40 includes a second flat stop 43 and a second V-grooved stop 45, separated by coil assembly 56. Illustratively, the each flat and V-groove stop are formed from corrosion protected steel.

Figure 6A:
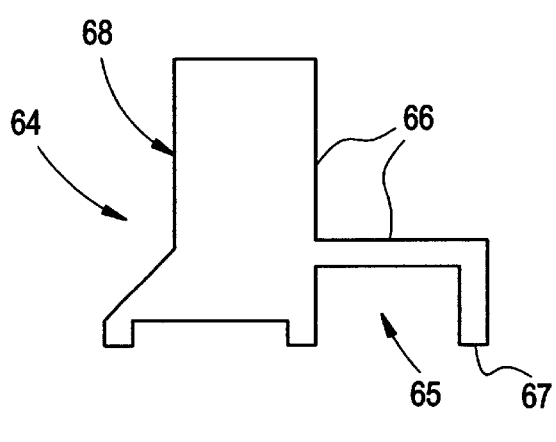
FIGS. 6A, 6B and 6C illustrate flat and V-groove stop blocks that may be utilized in the present invention.
Figure 6B:
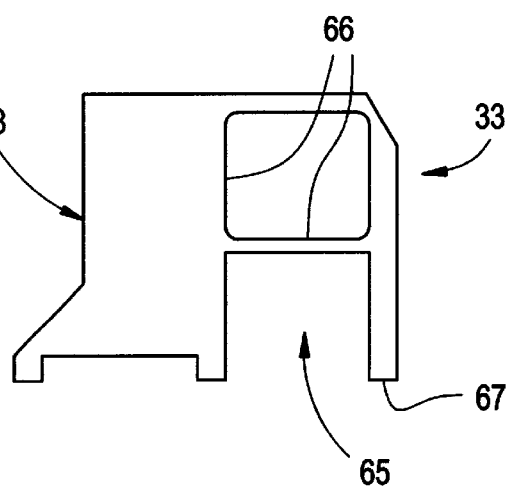
Figure 6C:
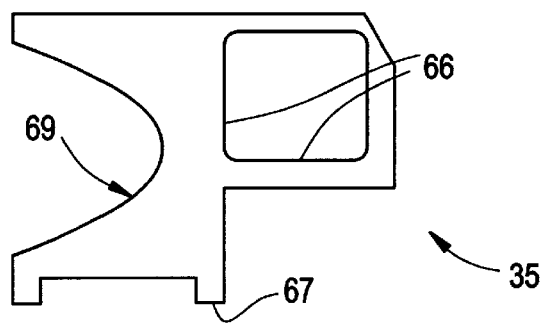

FIGS. 6A and 6B illustrate flat stop blocks, while FIG. 6C illustrates a V-grooved stop block, which may be used in the present invention. Specifically, FIG. 6B illustrates flat stop block 33 and FIG. 6A illustrates flat stop block 64 (showing the dimensions which are similar to both) which is an alternate embodiment. Both include relief pockets 65 (which help eliminate bond creep), coil bobin interface surfaces 66, switching impact stabilizers (which are important due to the small bonding areas), and contact surfaces 68. V-grooved stop block 35, illustrated in FIG. 6C, includes a V-groove contact surface, as shown.

In another embodiment, open V-grooved stops 135 and 145 are employed which ease the manufacturing process, as compared to "closed" V-grooved stops, as shown in FIG. 4.

The operation of the FCOS 10 will now be described. The magnetic field generator, via first and second coil assemblies 54, 56, selectively generates a first or a second repelling magnetic field, respectively. Accordingly, the second magnetic field, generated from the second coil assembly 56, causes the magnetic sleeve 52 and second cylindrical region 62 to move into contact with the first stop block 30 in a first position. Similarly, the first magnetic field, generated from the first coil assembly 54, causes the magnetic sleeve 52 and second cylindrical region 62 to move into contact with the second stop block 40 in a second position. Using the flat stop in conjunction with the V-groove stop and the spherical surface of the second cylindrical region 62 ensures that during operation, the second end 58 of the coupler will be positioned by three well-defined contact points (one at the flat stop and two at the V-groove stop).

The generated magnetic fields bend the coupled region to switch between cross and bar states. The strain resulting from such bending causes the coupled fibers to lie along different bend radii resulting in a variable power coupling ratio. In other words, the magnetic fields cause the second end 58 of fused optical coupler 19 to rotate, along a predetermined plane of rotation, until the coupler is latched against stop block 30 or 40 to achieve one of the two equilibrium positions (i.e., either the cross or bar state). These mechanics are discussed below.

In the first position (when magnetic sleeve 52 is in contact with first stop block 30), port 1 is optically connected with port 3, while port 4 is optically connected with port 2. As discussed, this is known as the crossed state. In the second position (when magnetic sleeve 52 is in contact with second stop block 40), port 1 is optically connected with port 2 and port 4 is optically connected with port 3. The second position is the bar state. To switch the FCOS between the cross and bar states, a current is passed through,either coil assembly 54 or 56, as desired. This will cause magnetic sleeve 52 to be pushed away from the stop block that is connected to the activated coil, and towards the opposite stop block.

For example, when a current is passed through coil assembly 54, magnetic sleeve 52 is pushed towards second stop block 40, and the FCOS is in the bar state. Similarly, when a current is passed through coil assembly 56, magnetic sleeve 52 is pushed towards first stop block 30, and the FCOS is in the cross state. Note that the number of coil windings in each coil assembly is chosen so that switching can reproducibly occur from either the cross or the bar state with a pulse provided by, e.g., a 60 mF capacitor, charged to 15 V, and discharged directly through the coil.

FCOS 10 may optionally include a sensor element 22, e.g., a Hall Effect Sensor, for detecting whether the FCOS is in the bar or the cross state. Specifically, sensor element 22 contacts a selected stop block on axis with its magnetic core. Note that magnetic flux leaks through the axis of the core either towards or away from the core, depending upon which stop block the magnetic sleeve contacts. Accordingly, the state of the fused coupler optical switch may be detected as sensor element 22 senses a 180 degree change in the direction of the magnetic flux.

Figure 5:
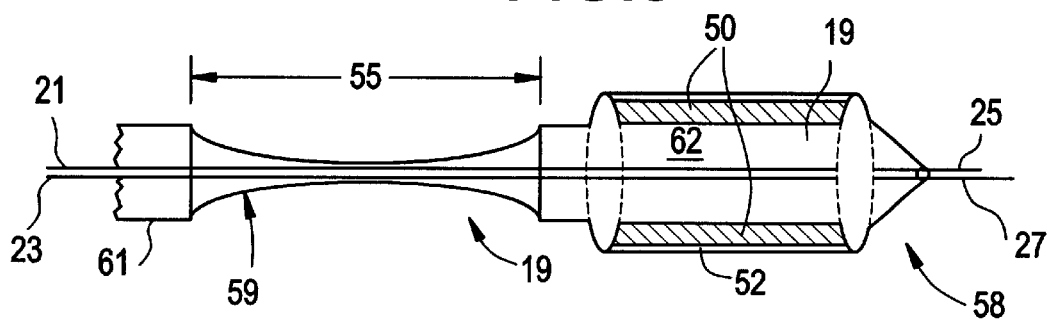
FIG. 5 is a cross sectional side view of the optical switch illustrating an athermalized joint according to a further illustrative embodiment of the invention.

In another preferred embodiment, shown in FIG. 5, there is an athermalized joint 50 positioned between magnetic sleeve 52 and fused optical coupler 19. Preferably, the athermalized joint is formed from an elastomeric material such that the coefficients of thermal expansion of the coupler and the sleeve essentially match. Note that although the fibers in coupling region 55 are shown separated (for ease of viewing), it should be understood that the fibers are actually fused together.

Preferably, the inventive FCOS 10 is designed such that the directivity between ports 1 and 2 and ports 3 and 4 will be greater than 30 Db across an optical wavelength of 1540 to 1560 nm. In addition, the FCOS can illustratively handle an average optical power up to 50 mW with a peak optical power of approximately 250 Mw. Further, the FCOS may be mounted on a metal board having a flatness requirement of 0.001 inches maximum and a roughness requirement of approximately $64 \times 10^6$ inches or be mounted on a printed wiring (or circuit) board (PWB).

Finally, the above-discussion is intended to be merely illustrative of the invention. Numerous alternative embodiments may be devised by those having ordinary skill in the art without departing from the spirit and scope of the following claims.

What is claimed is:

1. An optical switch comprising
   an optical coupler including first, second and third optical ports,
   an armature formed from a magnetic material for holding a portion of said coupler,
   a magnetic field generator for generating a first magnetic field state which acts on said armature for causing said coupler to be in a first mechanical position in which said first port is optically coupled to said third port and for generating a second magnetic field state which acts on said armature for causing said coupler to be in a second mechanical position in which said first port is optically coupled to said second port,
   a first stop block for maintaining said coupler in said first mechanical position, and
   a second stop block for maintaining said coupler in said second mechanical position,
   wherein said first and second stop blocks being V-grooved stop blocks.

2. The optical switch of claim 1 further comprises a base plate,
   wherein said magnetic field generator comprises first and second coil assemblies mounted opposite one another on said base plate,
   wherein said first stop block in mounted on said baseplate adjacent said first coil assembly,
   wherein said second stop block is mounted on said baseplate adjacent to said second coil assembly opposite said first V-grooved stop block, and
   wherein said armature is located between said first and second coil assemblies.

3. An optical switch comprising
   an optical coupler including first, second and third optical ports,
   an armature formed from a magnetic material for holding a portion of said coupler,
   a magnetic field generator for generating a first magnetic field state which acts on said armature for causing said coupler to be in a first mechanical position in which said first port is optically coupled to said third port and for generating a second magnetic field state which acts on said armature for causing said coupler to be in a second mechanical position in which said first port is optically coupled to said second port,
   a first stop block for maintaining said coupler in said first mechanical position,
   a second stop block for maintaining said coupler in said second mechanical position, and
   a magnetic field detector element for detecting said first magnetic field state and said second magnetic field state.

4. The optical switch of claim 3 wherein said magnetic field detector element is a Hall element.

5. The optical switch of claim 1 further including:
   a first flat stop block for cooperating with said first V-grooved stop block for maintaining said coupler in said first position, and
   a second flat stop block for cooperating with said second V-grooved stop block for maintaining said coupler in said second position.

6. An optical switch comprising:
   a coupler comprising first and fourth ports at a first end, second and third ports at a second end, and a coupling region between the first and second ends,
   a clamping element for rigidly clamping said first end of said coupler, said second end of said coupler being free,
   a magnetic sleeve surrounding said coupler near said free end,
   a first stop block located on one side of said sleeve,
   a second stop block located on the opposite side of said sleeve from said first stop block, and
   a magnetic circuit for generating a first magnetic field which causes said sleeve to move into contact with said first stop block and for generating a second magnetic field which causes said sleeve to move into contact with said second stop block,
   said first stop block comprising a first flat stop and a first V-groove stop,
   said second stop block comprising a second flat stop and a second V-groove stop.

7. An optical switch comprising:
   a coupler comprising first and fourth ports at a first end, second and third ports at a second end, and a coupling region between the first and second ends,
   a clamping element for rigidly clamping said first end of said coupler, said second end of said coupler being free,
   a magnetic sleeve surrounding said coupler near said free end,
   a first stop block located on one side of said sleeve,
   a second stop block located on the opposite side of said sleeve from said first stop block,
   a magnetic circuit for generating a first magnetic field which causes said sleeve to move into contact with said first stop block and for generating a second magnetic field which causes said sleeve to move into contact with said second stop block, and
   a sensor element for detecting said first magnetic field or said second magnetic field
   said first stop block comprising a first flat stop and a first V-groove stop,
   said second stop block comprising a second flat stop and a second V-groove stop.

* * * * *